UNITED STATES PATENT OFFICE.

ROBERT REIMAN, OF EGG HARBOR CITY, NEW JERSEY.

PROCESS OF MANUFACTURING ARTIFICIAL BONE.

SPECIFICATION forming part of Letters Patent No. 533,746, dated February 5, 1895.

Application filed February 24, 1894. Serial No. 501,430. (No specimens.)

*To all whom it may concern:*

Be it known that I, ROBERT REIMAN, of Egg Harbor City, in the county of Atlantic and State of New Jersey, have invented a new and Improved Process of Manufacturing Artificial Bone, of which the following is a full, clear, and exact description.

This invention is an improvement upon or enlargement of the invention secured to me by Letters Patent, No. 494,891, dated April 4, 1893, for a process of manufacturing artificial bone, which consists in first chemically dissolving natural bone or bone meal into its main constituents, then neutralizing these elements by precipitation, filtering and washing them, and afterwards mixing them with albumen, and alumina sulphate, and subsequently, when partly dried, subjecting the material to a high temperature and simultaneously applying powerful pressure; and which further consists in separating, by chemical action, the constituent parts of raw or natural bone in a finely comminuted state, and after preparation, by precipitation and washing, mixing them together with substances operating to produce a hardening effect and to develop the original bone substance into gelatine by a high heat, at the same time keeping the mass under strong pressure in suitable molds or receptacles.

The invention, which is the subject of this application, consists in combining or including other processes with the above, substantially as hereinafter described, whereby I supplement and complete or improve the hereinbefore named process of manufacturing artificial bone.

In carrying out my invention for further utilizing bone or bone waste, I first proceed, as has been done before, for manufacturing bone gelatine by macerating natural bone by hydrochloric acid, and after extraction of the phosphate of lime, causing the liquid containing the latter to be separated and used for making bonegreen or Dingler green which is a combination of calcium phosphate and chrome phosphate, and then after washing and neutralizing the remaining bone fiber and when the gelatine is finished by boiling, separating it from the muddy residue by pressing. This so far only represents the preparation of the constituent parts for new compositions, the manufacture of which I am about to describe and which I believe to be new and of my invention. Thus it is found so far that three separate masses are developed from the bone material, viz: first, gelatine, when assumed to be dried, about one fourth in weight of the dry bone; second, the bone green, and, third, the white muddy residue, that is, the fiber in connection with a certain amount of glue.

To obtain the desired composition, I prefer to operate as follows: For a jet black composition, I slowly heat the gelatine to boiling point, then add a strong solution of chromate of potash and stir constantly. I find a good proportion for this mixture to be one pound of dry gelatine and two to three ounces of the chromate. After the mixture of these ingredients, I intermix a small quantity of drying oil. Thus for a black composition I use linseed oil, crude or boiled, stirring the same into the mixture, when a saponification takes place among the ingredients. I then add some logwood decoction to color the mass black. In order to build up the body of the composition, either animal or vegetable charcoal, in a finely powdered state is advised, the former giving more weight than the latter. The proportion in this mixing is from about two, to two and a half, to one part of dry gelatine. The charcoal or coal dust is to be warmed to boiling temperature of the mass and slowly stirred in. When the ingredients are well combined, the mass is to be evaporated, and worked through a kneading machine which puts it in a condition ready for molding. To make a green composition of any shade, the same process is followed, only using less bichromate and using castor oil instead of linseed oil, also substituting bone green for the powdered coal or charcoal. Each of these compositions obtain a high degree of insolubility by application of the chromate, and gain durability and beauty by exposure to light and air.

The composition is uninflammable, has a more congenial temperature to touch than the different mineral substances, is impervious to influence of weather, and forms in fact a perfect plastic mass for numerous industrial purposes. It also withstands a considerable degree of heat without change. It will neither burn nor crack. In glowing heat it only smolders.

Having thus described my invention, I claim as new and desire to secure by Letters Patent—

1. The herein-described method of manufacturing artificial bone, which consists in combining gelatinous matter with a chromic compound, adding a suitable oil to secure saponification, and admixing thereto a suitable filling substance to give body to the composition, substantially as described.

2. The herein-described method of manufacturing artificial bone, which consists in combining gelatinous matter with a chromic compound, adding a drying oil, and admixing a suitable filling substance to give body to the composition, substantially as described.

3. As an improvement in the manufacture of artificial bone from natural bone, suitably macerating the natural bone, separating the liquid from the organic solids, separating the gelatine from the residue of the organic matter, and then converting the gelatine into artificial bone without the said residue, by the addition of a chromate and a drying oil, substantially as described.

4. As an improvement in the manufacture of artificial bone from natural bone, suitably macerating the natural bone, separating the liquid from the organic solids, separating the gelatine from the residue of the organic matter, and then converting the gelatine into artificial bone without the said residue, by the addition of a chromate and a drying oil and a material that will give body to the composition.

ROBERT REIMAN.

Witnesses:
CHARLES GRUNOW,
ALBERT C. STEPHANY.